(12) United States Patent
Nishimura

(10) Patent No.: US 7,784,394 B2
(45) Date of Patent: Aug. 31, 2010

(54) BUTT JOINING METHOD

(75) Inventor: Makoto Nishimura, Hachiouji (JP)

(73) Assignee: Hitachi, Ltd., Tokyo (JP)

( * ) Notice: Subject to any disclaimer, the term of this patent is extended or adjusted under 35 U.S.C. 154(b) by 150 days.

(21) Appl. No.: 11/892,466

(22) Filed: Aug. 23, 2007

(65) Prior Publication Data
US 2008/0072654 A1 Mar. 27, 2008

(30) Foreign Application Priority Data
Aug. 31, 2006 (JP) .............................. 2006-236732

(51) Int. Cl.
*F16J 1/10* (2006.01)
(52) U.S. Cl. ........................... 92/129; 92/168; 403/274; 403/298; 403/332; 403/375
(58) Field of Classification Search ................. 403/274, 403/292, 298, 332, 361, 375, 282; 92/129, 92/165 R, 168
See application file for complete search history.

(56) References Cited

U.S. PATENT DOCUMENTS

| 587,695 | A | * | 8/1897 | Billing et al. ................ 285/114 |
| 1,203,546 | A | * | 10/1916 | Parsons ....................... 403/274 |
| 1,823,158 | A | * | 9/1931 | Mogford et al. ............. 403/274 |
| 4,850,621 | A | * | 7/1989 | Umehara ..................... 285/322 |
| 4,852,862 | A | * | 8/1989 | Bauer et al. ................ 92/165 R |
| 5,072,655 | A | * | 12/1991 | Adler .......................... 403/274 |
| 5,536,100 | A | * | 7/1996 | Kiefer ......................... 403/274 |
| 5,606,790 | A | * | 3/1997 | Laue ........................... 403/274 |

FOREIGN PATENT DOCUMENTS

| JP | 7-280016 | 10/1995 |
| JP | 2002-81483 | 3/2002 |
| JP | 2003-225733 | 8/2003 |

* cited by examiner

*Primary Examiner*—Michael P Ferguson
(74) *Attorney, Agent, or Firm*—Wenderoth, Lind & Ponack, L.L.P.

(57) ABSTRACT

A butt joining method is provided that is capable of joining together two members with high strength and high accuracy by utilizing plastic deformation. A bolt-shaped member having a female part at one end thereof and a piston rod having three annular grooves on a forward end part (male part) fittable to the female part are butted against each other with the female and male parts being fitted to each other. In this state, the side wall of the female part is radially pushed into the annular grooves on the piston rod by mechanical clinching technique. At this time, the pushing process is performed so that clinch portions formed by the pushing process are staggered between mutually adjacent ones of the annular grooves, thereby ensuring the desired joining strength and suppressing the elongation of the material, and thus preventing opening of the butt joint between the bolt-shaped member and the piston rod.

12 Claims, 6 Drawing Sheets

BUTT JOINING METHOD

BACKGROUND OF THE INVENTION

The present invention relates to a butt joining method wherein two members are butt-joined by utilizing plastic deformation. The present invention also relates to a mechanical clinching apparatus used to carry out the butt joining method. Further, the present invention relates to a joined rod obtained by the butt joining method, and also relates to a method of manufacturing a cylinder apparatus.

One type of hydraulic shock absorber has a structure as shown in FIG. 9, by way of example. The hydraulic shock absorber includes an inner tube (cylinder) 2 having a piston 1 slidably fitted therein. The inner tube 2 is housed in an outer tube 3, one end of which is closed. A piston rod (rod) 4 is connected at one end thereof to the piston 1. The other end of the piston rod 4 extends to the outside through a rod guide 5 and a rod seal 6 that are fitted to the opening end portions of both the inner and outer tubes 2 and 3. A hydraulic fluid sealed in the inner tube 2 is passed through piston valves 7 provided on the piston 1 and also through a base valve 8 provided in the bottom of the outer tube 3 to generate damping force during extension stroke and compression stroke. A reservoir 9 is formed between the inner tube 2 and the outer tube 3 to compensate for a change in amount of hydraulic fluid in the inner tube 2 that corresponds to the amount by which the piston rod 4 enters or withdraws from the inner tube 2.

When this type of hydraulic shock absorber is used as a suspension system of a vehicle, a bolt-shaped member (mounting member) 10 is joined to the forward end of the piston rod 4 to serve as a mounting part that is to be secured to a vehicle body-side member, and an eye 11 is joined to the bottom of the outer tube 3 to serve as a mounting part that is to be secured to an axle-side member. In addition, a spring retainer 12 is joined to an intermediate portion of the outer tube 3 to retain a coil spring. To butt-join the bolt-shaped member 10 to the piston rod 4, projection welding (see a welded joint 13 in the figure) has heretofore been generally used.

In such a butt joining process using projection welding, welding conditions, such as welding current and welding pressure, need to be strictly controlled in order to ensure the desired joining strength. Particularly, when medium to high carbon steel is used as a material of the bolt-shaped member 10 from the need to ensure high joining strength, much more strict control is required for welding conditions because such carbon steel is inferior in weldability. Further, the piston rod 4 is subjected to metal plating beforehand. In this regard, fine cracks that may be present in the metallic deposit on the piston rod 4 are likely to be expanded by the thermal effect of the projection welding, causing problems in terms of corrosion resistance. In addition, spatters caused by welding deteriorate working environments.

Under these circumstances, Japanese Patent Application Publication No. 2003-225733 proposes a countermeasure in which a threaded piston rod is used that has an annular groove previously formed on a part thereof where the head 10a of the bolt-shaped member 10 (see FIG. 9) would otherwise be provided, and a collar prepared as a separate member is joined (fitted) into the annular groove by utilizing plastic flow, whereby the bolt-shaped member 10 is omitted. This technique can solve various problems associated with the above-described welding. The countermeasure disclosed in this JP publication suffers, however, from the following problems. Because a thread is formed on a long rod, rolling process cannot be used to form a thread thereon, but instead a machining process is unavoidably required for thread cutting, which causes an increase in the production cost of the piston rod itself. In addition, because the overall length of the piston rod increases by an amount corresponding to the length of the bolt-shaped member 10, the metal plating equipment needs to be altered, and the cost increases correspondingly.

Japanese Patent Application Publication No. Hei 7-280016 discloses a technique of joining a mounting member to a piston rod of a gas spring. According to this technique, a cup-shaped female part is provided on the mounting member, and an annular groove is provided on one end part of the piston rod. After the one end part (male part) of the piston rod has been fitted to the female part of the mounting member so as to be butted against it, the side wall of the female part is locally pushed into the annular groove by mechanical clinching technique, thereby joining together the mounting member and the piston rod. With this technique, however, clinch portions formed by pushing the side wall of the female part are merely discontinuously provided along one annular groove. Therefore, the joining technique is not satisfactory in terms of joining strength and cannot be applied as it is to a piston rod of a hydraulic shock absorber for a suspension system that requires the above-described high joining strength.

Meanwhile, Japanese Patent Application Publication No. 2002-81483 discloses a method of manufacturing a hydraulic shock absorber. According to this method, after a piston rod having a piston secured to one end thereof has been inserted into a cylinder, a rod seal for sealing the cylinder is pressed axially with a tubular pressing jig, and while doing so, an upper end portion of an outer tube is deformed radially inward with a staking jig to secure the rod seal so as to close the opening end of the cylinder. In this case, the pressing jig is adapted to press the rod seal with the piston rod inserted therein. Therefore, if a bolt-shaped member of a predetermined size has previously been butt-welded to the piston rod, the head of the bolt-shaped member is likely to interfere with the pressing jig. This imposes a limitation on the design of the piston rod. The problem can be solved by butt joining together the piston rod and the bolt-shaped member at the final step after the piston rod has been assembled into the cylinder. If doing so, however, spatters (contaminants) caused by welding may adhere to the piston rod and damage the rod seal during use. Accordingly, the idea of carrying out the butt joining process at the final step has been given up on in the present state of the art.

SUMMARY OF THE INVENTION

The present invention has been made in view of the above-described technical background.

Accordingly, an object of the present invention is to provide a butt joining method capable of joining together two members with high strength by utilizing plastic deformation.

Another object of the present invention is to provide a mechanical clinching apparatus suitable for carrying out the butt joining method.

Still another object of the present invention is to provide a joined rod obtained by the butt joining method.

A further object of the present invention is to provide a manufacturing method capable of smoothly obtaining a cylinder apparatus.

The present invention is applied to a butt joining method in which a first member having a female part and a second member having a male part fittable to the female part and an annular groove on the male part are butted against each other with the female part and the male part being fitted to each other, and thereafter, the side wall of the female part is radially and locally pushed into the annular groove on the male part by mechanical clinching technique, thereby joining together the first and second members. According to the present invention, a plurality of annular grooves are formed on the male part of the second member, and the pushing by mechanical clinching technique is performed for each of the annular grooves.

Thus, in the butt joining method according to the present invention, the pushing by mechanical clinching technique is performed for each of a plurality of annular grooves. Therefore, the joining area enlarges as compared with a joint structure in which the pushing process is performed for only one annular groove. Accordingly, the joining strength increases to a considerable extent.

In the butt joining method according to the present invention, the pushing by mechanical clinching technique may be performed at circumferentially spaced positions along each of the annular grooves such that the pushed positions are circumferentially coincident between mutually adjacent ones of the annular grooves. Alternatively, the pushing by mechanical clinching technique may be performed at circumferentially spaced positions along each of the annular grooves such that the pushed positions are circumferentially staggered between mutually adjacent ones of the annular grooves. In the former case, the elongation of the material of a non-clinch portion between two axially facing clinch portions can be suppressed. In the latter case, the elongation of the material of a non-clinch portion between two circumferentially adjacent clinch portions can be suppressed. Thus, the overall elongation of the material of the female part can be suppressed. Consequently, it becomes unlikely that a gap will occur in the butt joint between the two members. The pushing by mechanical clinching technique may be performed at circumferentially spaced positions along each of the annular grooves such that the pushed positions are circumferentially displaced between mutually adjacent ones of the annular grooves. In this case, both the above-described advantageous effects can be expected.

In the butt joining method according to the present invention, the number of annular grooves formed on the male part of the second member may be at least three. In this case, it is desirable that pushed positions for the first and third annular grooves be circumferentially coincident with each other, and that pushed positions for the second annular groove be at circumferential midpoints between the pushed positions for the first and third annular grooves. With this arrangement, the overall elongation of the material of the female part can be suppressed even more effectively.

In the butt joining method according to the present invention, an end surface of the female part of the first member may be axially retained during the pushing by mechanical clinching technique. In this case, the overall elongation of the material of the female part can be suppressed even more effectively.

In addition, the present invention provides a mechanical clinching apparatus including a work support mechanism that supports a first member having a female part and a second member having a male part fittable to the female part and a plurality of annular grooves on the male part such that the female part and the male part are mutually fitted in butting contact with each other. A plurality of clinching dies are radially arranged around the work support mechanism. The clinching dies are adapted to be driven to move toward each other by a driver to locally push the side wall of the female part into the annular grooves on the male part. The clinching dies include first clinching dies having pushing projections corresponding to at least one of the annular grooves and second clinching dies having pushing projections corresponding to another of the annular grooves that is adjacent to the at least one of the annular grooves to which the pushing projections of the first clinching dies correspond.

With the mechanical clinching apparatus arranged as stated above, the side wall of the female part of the first member can be simultaneously pushed into a plurality of annular grooves provided on the male part of the second member by arranging two different types of clinching dies alternately in the circumferential direction and advancing the clinching dies toward each other.

In the mechanical clinching apparatus according to the present invention, the first clinching dies and the second clinching dies may be alternately arranged in the circumferential direction so that the respective pushing projections are circumferentially displaced from each other. Alternatively, the first clinching dies and the second clinching dies may be alternately arranged in the circumferential direction so that the respective pushing projections are circumferentially staggered from each other.

In the mechanical clinching apparatus according to the present invention, at least either of the first clinching dies and the second clinching dies may be provided with end-retaining projections that retain an end surface of the female part of the first member. In this case, the overall elongation of the material of the female part can be suppressed even more effectively.

In the mechanical clinching apparatus according to the present invention, the first clinching dies and the second clinching dies may each have a split structure in which the clinching die is divided into two in the height direction thereof at a valley adjacent to the pushing projection thereof. In this case, the stress concentration in the clinching dies is reduced. Therefore, breakage of the clinching dies is prevented.

In addition, the present invention provides a joined rod including a first rod member having a female part at one end thereof and a second rod member having a plurality of annular grooves on one end part thereof that is to be fitted to the female part. The first rod member and the second rod member are joined together coaxially through annular clinches formed by radially and locally pushing the side wall of the female part of the first rod member into the annular grooves on the second rod member by mechanical clinching technique.

The term "annular clinch" as used herein means a series of clinch joints wherein clinch portions pushed by mechanical clinching technique and non-clinch portions are alternately arranged in the circumferential direction. In the joined rod arranged as stated above, a plurality of axially spaced annular clinches are provided. Therefore, the joining area enlarges as compared with a joined rod having only one annular clinch. Accordingly, the joining strength increases to a considerable extent.

In the joined rod according to the present invention, the circumferentially spaced clinch portions of the annular clinches may be circumferentially coincident between mutually adjacent ones of the annular clinches. The circumferentially spaced clinch portions may be circumferentially displaced between mutually adjacent ones of the annular clinches. Alternatively, the circumferentially spaced clinch portions may be circumferentially staggered between mutually adjacent ones of the annular clinches.

The joined rod may be arranged as follows. The annular grooves on the male part of the second rod member comprise at least first, second and third annular grooves. The clinch portions of the annular clinches for the first and third annular grooves are circumferentially coincident with each other, and the clinch portions of the annular clinch for the second annular groove are at circumferential midpoints between the clinch portions of the annular clinches for the first and third annular grooves.

Further, the annular clinches may be provided along an end surface of the female part of the first rod member.

In the joined rod according to the present invention, the above-described rod members may be of any kind. For example, the first rod member may be a mounting member having a mounting part at the other end thereof, and the second rod member may be a piston rod of a cylinder apparatus.

In this case, it is desirable that the annular grooves on the second rod member be trapezoidal in section, and that a wall surface of each trapezoidal annular groove at a side thereof closer to a joint end of the second rod member be perpendicular to the axis of the second rod member, and a wall surface of each trapezoidal annular groove at a side thereof remote from the joint end be a tapered surface that is inclined with respect to the axis.

In addition, the present invention provides a method of manufacturing a cylinder apparatus. The method includes the step of preparing a mounting member having a female part at one end thereof and a mounting part at the other end thereof and preparing a piston rod having a piston secured to one end thereof and a male part at the other end thereof. The male part is fittable to the female part. The piston rod further has a plurality of annular grooves on the male part. The method further includes the step of inserting the piston rod into a cylinder having an opening at one end thereof such that the piston precedes the piston rod, the step of closing the opening of the cylinder with a seal member having the piston rod extending therethrough, the step of butting the mounting member and the piston rod against each other with the female part and the male part being fitted to each other, and the step of radially pushing the side wall of the female part into the annular grooves on the male part by mechanical clinching technique, thereby joining together the mounting member and the piston rod.

In the above-described cylinder apparatus manufacturing method, the mounting member and the piston rod are joined together by mechanical clinching technique. Therefore, no contaminants can adhere to the piston rod, and hence there is no possibility of the piston seal being damaged during use even if the mounting member and the piston rod are joined together at the final step after the piston rod has been assembled into the cylinder and the opening of the cylinder has been closed. In addition, joining the mounting member and the piston rod at the final step makes it possible to smoothly perform the cylinder's opening closing step, which precedes the joining step. As a result, there is no longer a limitation on the design of the piston rod.

DETAILED DESCRIPTION OF THE INVENTION

An embodiment for carrying out the present invention will be described below with reference to the accompanying drawings.

Figure 1:
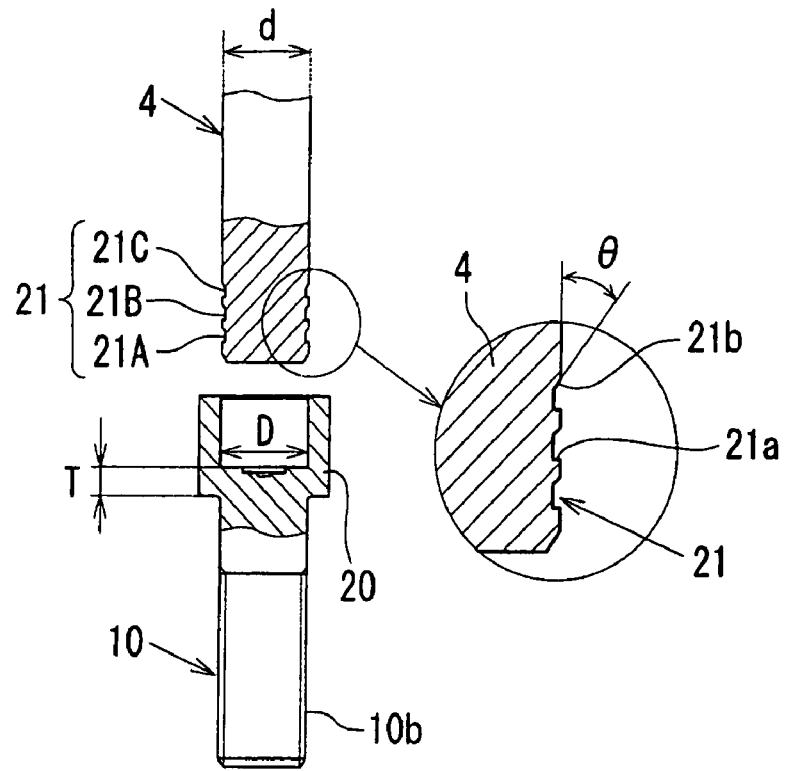
FIG. 1 is a sectional view showing an embodiment in which a butt joining method according to one embodiment of the present invention is applied to butt joining of a bolt-shaped member to a piston rod of a hydraulic shock absorber.
Figure 9:
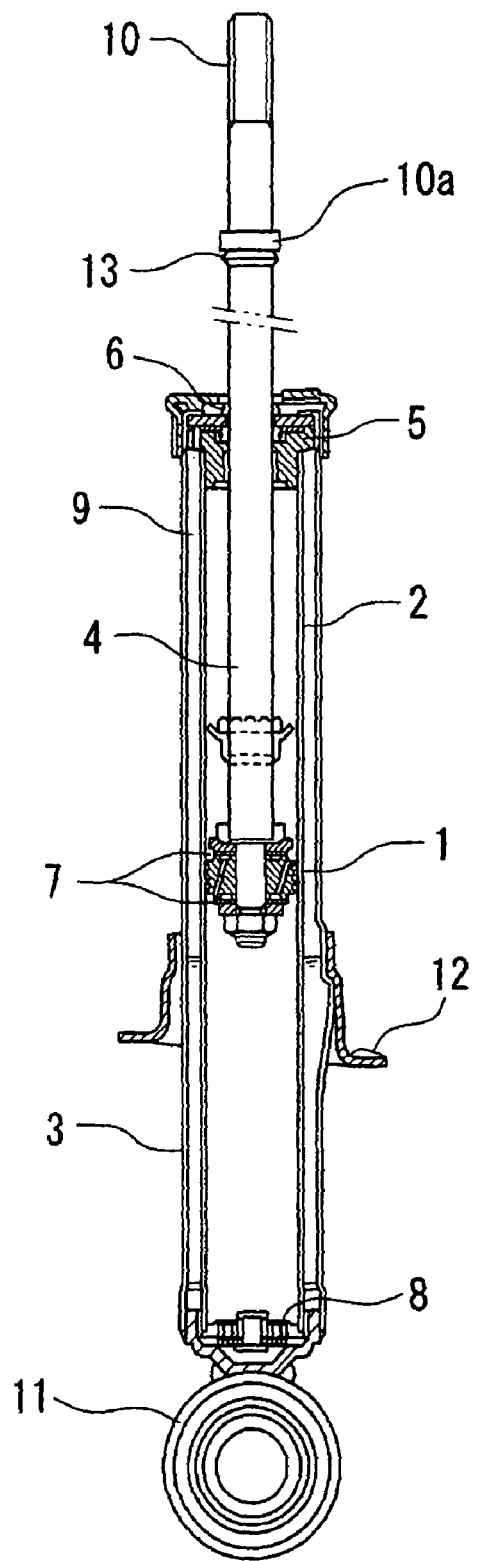
FIG. 9 is a sectional view showing the general structure of a hydraulic shock absorber on which the butt joining method of the present invention is to be carried out.

In this embodiment, a bolt-shaped member (first rod member; mounting member) 10 is butt-joined to a piston rod (second rod member) 4 of the hydraulic shock absorber shown in FIG. 9 (described above) to produce one joined rod. To carry out the present invention, as shown in FIG. 1, a cup-shaped female part 20 is previously provided at one end of the bolt-shaped member 10 in place of the above-described head 10a (see FIG. 9), and three annular grooves 21 (21A, 21B and 21C) are previously provided on a forward end part (male part) of the piston rod 4.

The female part 20 of the bolt-shaped member 10 has a bore diameter D set slightly larger than the diameter d of the piston rod 4, so that the piston rod 4 can be fitted at one end thereof provided with the annular grooves 21 into the female part 20 with a slight clearance. The female part 20 has a bore bottom thickness T set so that a shear strength equal to the tensile strength of a threaded part 10b of the bolt-shaped member 10 can be obtained. In this embodiment, the bolt-shaped member 10 is made of a medium carbon steel (e.g. S45C). The entire bolt-shaped member 10, including the female part 20, is formed by cold forging. The threaded part 10b of the bolt-shaped member 10 is formed by thread rolling.

Meanwhile, each annular groove 21 provided on the piston rod 4 is trapezoidal in cross section. A wall surface of the annular groove 21 at a side thereof closer to the forward end of the piston rod 4 (i.e. closer to the bolt-shaped member 10) is formed as a perpendicular surface 21a perpendicular to the axis of the piston rod 4. A wall surface of the annular groove 21 at a side thereof closer to the rear end of the piston rod 4 at which it is connected to the piston 1 (see FIG. 9) is formed as a tapered surface 21b that is inclined at a predetermined angle θ with respect to the axis of the piston rod 4. The piston rod 4 has been subjected to metal plating (usually, hard chromium plating). In addition, the piston rod 4 has the above-described rod guide 5 and oil seal 6 preassembled thereonto. The preassembling of the rod guide 5 and the oil seal 6 is carried out from the forward end side of the piston rod 4 where the annular grooves 21 are provided. Because the rear end-side wall surface of each annular groove 21 is a tapered surface 21b as has been stated above, the oil seal 6 can pass over the annular grooves 21 without being caught by the edges of the annular grooves 21. Thus, damage to the oil seal 6 can be prevented. It should be noted that the inclination angle θ of the tapered surface 21b is set at about 45 degrees, by way of example.

Figure 2:
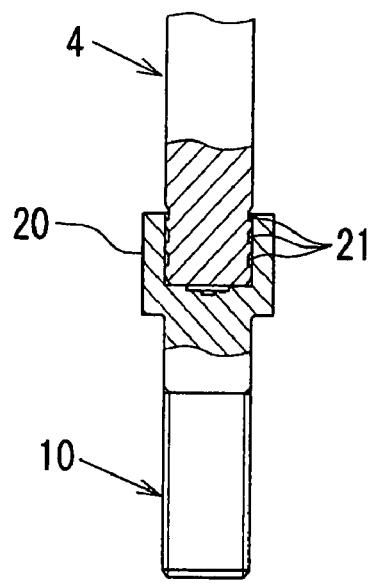
FIG. 2 is a sectional view showing an initial preparation step in the embodiment.

To join together the bolt-shaped member 10 and the piston rod 4, as shown in FIG. 2, the female part 20 of the bolt-shaped member 10 and the forward end part of the piston rod 4 that is provided with the annular grooves 21 are fitted to each other in butting contact with each other. It should be noted that the butting direction of the bolt-shaped member 10 and the piston rod 4 may be either of the following: The piston rod 4 may be moved downward so as to be butted against the bolt-shaped member 10 placed below it, as illustrated. Alternatively, the bolt-shaped member 10 may be moved downward so as to be butted against the piston rod 4 placed below it in reverse relation to the above.

Figure 3:
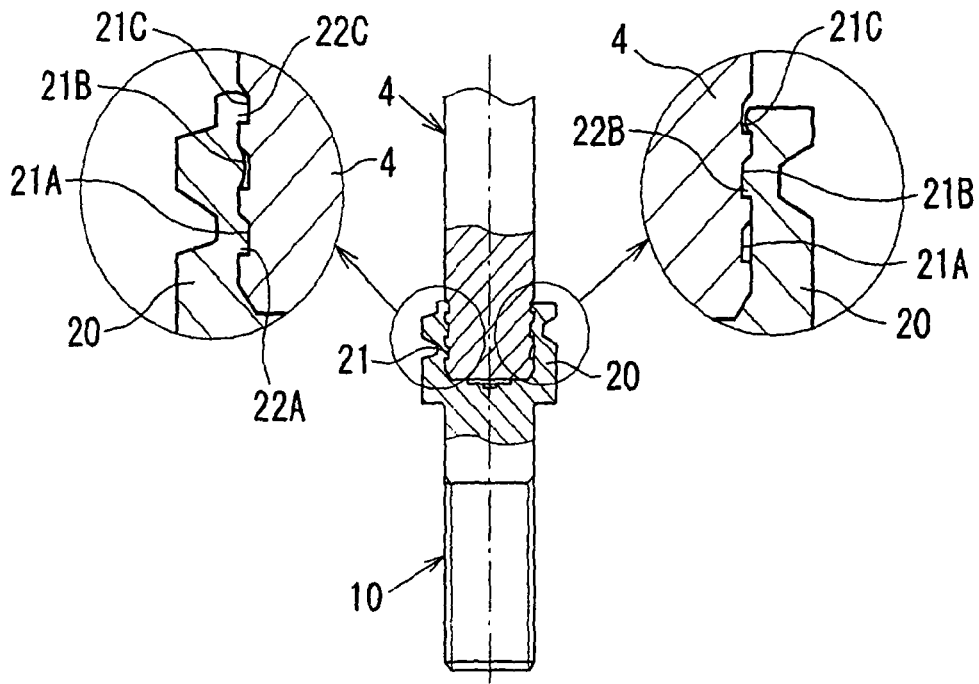
FIG. 3 is a sectional view of a joint made by mechanical clinching technique in the embodiment, showing it in different sections on opposite sides of the center line.
Figure 4:
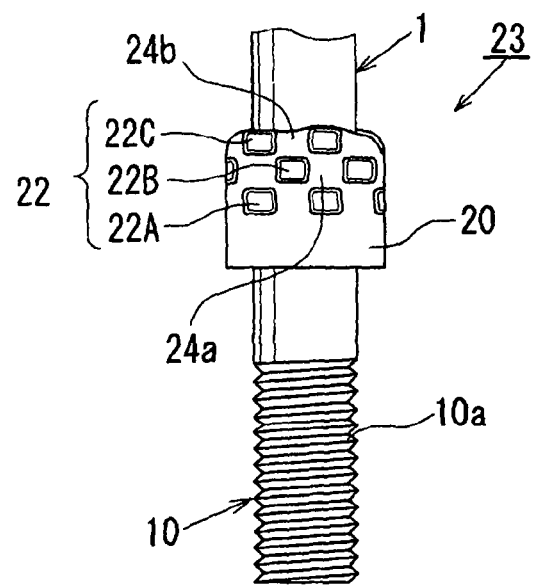
FIG. 4 is a side view showing the external configuration of a joined rod obtained in the embodiment.

After the bolt-shaped member 10 and the piston rod 4 have been butted against each other as stated above, the side wall of the female part 20 is radially pushed into the annular grooves 21 of the piston rod 4 by mechanical clinching technique (detailed later). As a result of the pushing process, as shown in FIG. 3, clinch portions 22 (22A, 22B and 22C) are formed in the annular grooves 21 of the piston rod 4 at positions corresponding to the pushed portions of the side wall of the female part 20, whereby the bolt-shaped member 10 and the piston rod 4 are coaxially butt-joined together through the clinch portions 22. Thus, a joined rod 23 as shown in FIG. 4 is completed.

In the above-described pushing process using mechanical clinching technique, the circumferentially spaced pushed portions for the first annular groove 21A and those for the third annular groove 21C are made circumferentially coincident with each other, and the circumferentially spaced pushed portions for the second annular groove 21B are set at the circumferential midpoints between the pushed portions for the first and third annular grooves 21A and 21C. Thus, the clinch portions 22 formed by the pushing process are, as shown in FIG. 4, arranged in a staggered pattern between mutually adjacent annular grooves 21. That is, the clinch portions 22B for the middle annular groove 21B are staggered from the clinch portions 22A and 22C for the annular grooves 21A and 21C, which are adjacent to the annular groove 21B.

In the joined rod 23 obtained as stated above, the clinch portions 22 formed by the pushing process using mechanical clinching technique are provided for each of the three annular grooves 21. Therefore, the joining area enlarges to a considerable extent as compared with a joint structure in which clinch portions are formed for only one annular groove. Accordingly, a sufficiently high joining strength can be ensured.

During the pushing process using mechanical clinching technique, pushed portions (clinch portions 22) are reduced in thickness, and this causes the material to elongate axially. In this embodiment, however, the clinch portions 22A for the first annular groove 21A and the clinch portions 22C for the third annular groove 21C are placed facing each other in the axial direction. Accordingly, the elongation of the material of non-clinch portions 24a (see FIG. 4) between the clinch portions 22A and 22C can be suppressed. In addition, because the clinch portions 22 are staggered between each pair of mutually adjacent annular grooves 21, the elongation of the material of a non-clinch portion 24b (see FIG. 4) between each pair of circumferentially adjacent clinch portions 22 can be suppressed. Thus, the overall elongation of the material of the female part 20 can be suppressed considerably. Consequently, there is only a slight gap between the bottom surface inside the female part 20 of the bolt-shaped member 10 and the forward end of the piston rod 4 (i.e. at the butt joint), and the overall length of the finished joined rod 23 falls within a specified length range.

In the above-described embodiment, the clinch portions 22B are arranged so as not to overlap the clinch portions 22A or 22C in an axial direction perpendicularly intersecting the circumferential direction (i.e. the clinch portions 22B are staggered from the clinch portions 22A and 22C). It is, however, also possible to adopt an arrangement in which the clinch portions 22B are circumferentially displaced from the clinch portions 22A and 22C so as to overlap the latter in the axial direction.

In the above-described embodiment, the piston rod 4 is provided with three annular grooves 21 (21A, 21B and 21C), and pushed portions are provided so as to be staggered between each pair of mutually adjacent annular grooves 21. It should be noted, however, that the number of annular grooves 21 provided on the piston rod 4 may be either two or four or more. Specifically, the arrangement shown in FIGS. 3 and 4 may be modified, for example, as follows. The second annular groove 21B may be omitted so that there are only the clinch portions 22A for the first annular groove 21A and the clinch portions 22C for the third annular groove 21C. Alternatively, the first annular groove 21A or the third annular groove 21C may be omitted so that there are only the second annular groove 21B and either the first annular groove 21A or the third annular groove 21C. In these arrangements, the pushed portions for the two annular grooves (any two of the annular grooves 21A, 21B and 21C) may be circumferentially displaced from each other.

Although in the foregoing embodiment the female part 20 provided on the bolt-shaped member 10 has a cup-shaped configuration, the female part 20 may be of any configuration as long as the forward end part (male part) of the piston rod 4 that is provided with the annular grooves 21 can be fitted thereinto. For example, the female part 20 may have a tulip shape defined by a plurality of circumferentially equally spaced axially extending wall portions.

Figure 5:
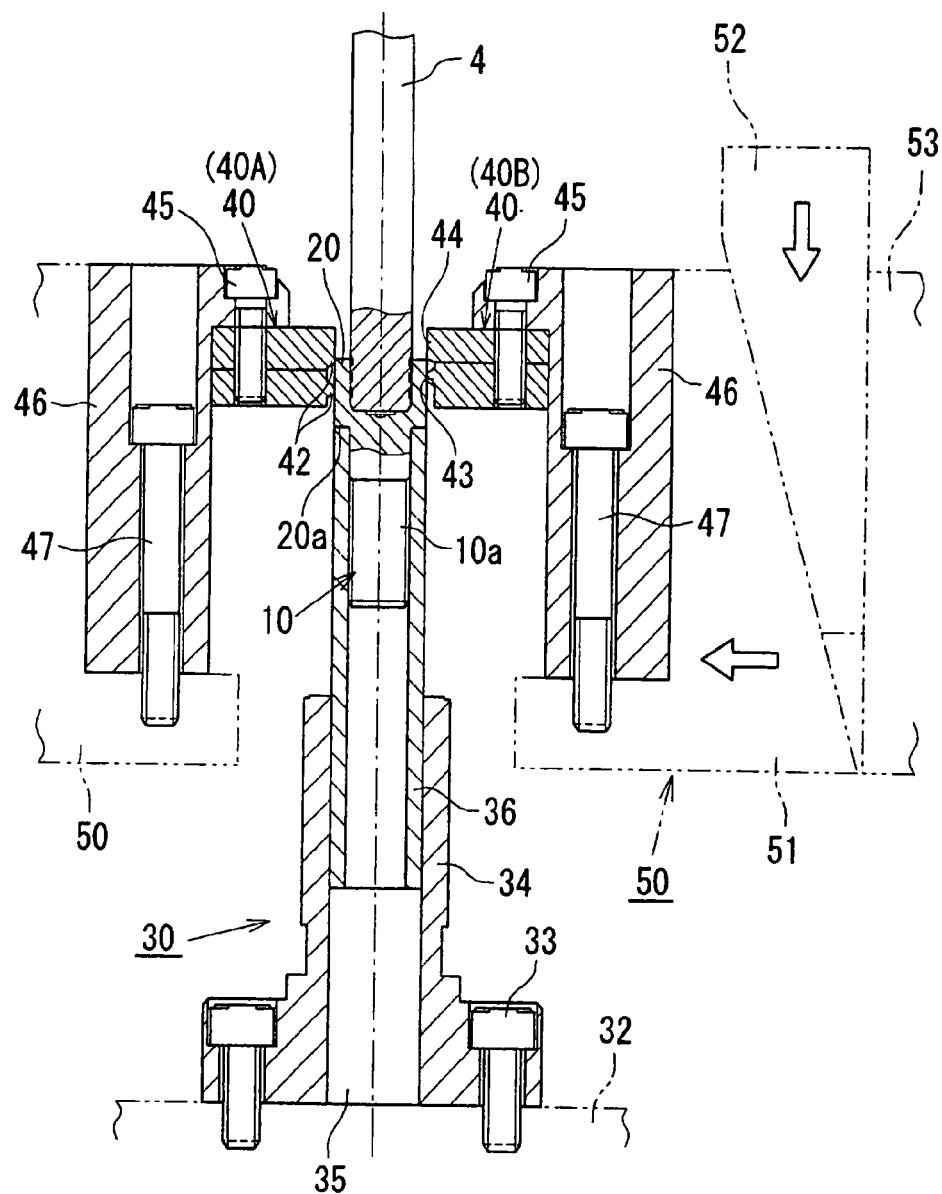
FIG. 5 is a sectional view of the general structure of a mechanical clinching apparatus used to carry out the butt joining method, showing the apparatus in different sections on opposite sides of the center line.
Figure 6:
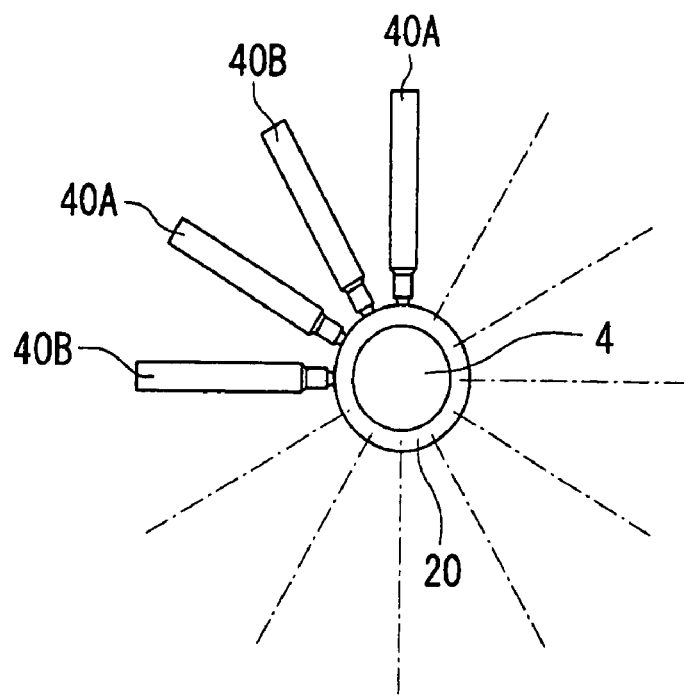
FIG. 6 is a plan view schematically showing the way in which clinching dies are arranged in the mechanical clinching apparatus.
Figure 7:
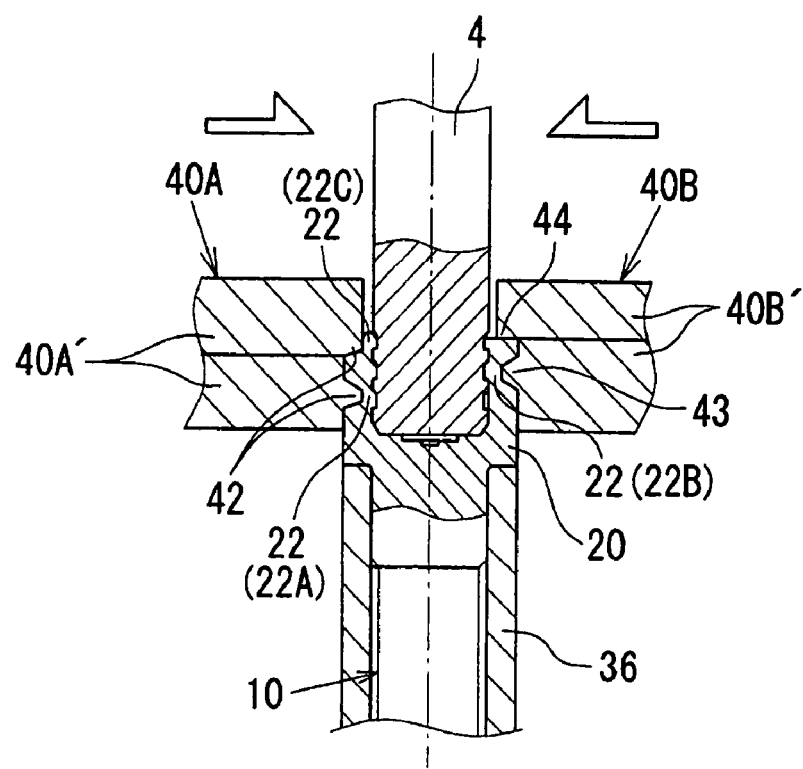
FIG. 7 is a sectional view showing the way in which mechanical clinching is carried out by the mechanical clinching apparatus in different sections on opposite sides of the center line.

A mechanical clinching apparatus that performs the above-described pushing process using mechanical clinching technique has, as shown in FIGS. 5 to 7, a work support mechanism 30 that supports the bolt-shaped member 10 and the piston rod 4, which are to be joined together, in butting contact with each other. The mechanical clinching apparatus further has a plurality of clinching dies 40 (40A and 40B) radially arranged around the work support mechanism 30 and a shrinker (driver) 50 that supports and drives the clinching dies 40.

In this embodiment, the work support mechanism 30 has a hollow support 34 secured to a fixed base 32 by using bolts 33. A support tube 36 is fitted in and supported by the support 34 with a lower end thereof abutting against a fixed block 35 disposed in the hollow inside of the support 34. The bolt-shaped member 10 is supported by the work support mechanism 30 in such a way that the threaded part 10b is inserted into the support tube 36 and the shoulder 20a on the back of the cup-shaped female part 20 is placed on the support tube 36.

The clinching dies 40 include two different types: first clinching dies 40A having pushing projections 42 corresponding to the first and third annular grooves 21A and 21C (see FIG. 3); and second clinching dies 40B having pushing projections 43 corresponding to the second annular groove 21B (see FIG. 3). The first clinching dies 40A and the second clinching dies 40B are arranged alternately in the circumferential direction so that the pushing projections 42 and 43 thereof are circumferentially staggered from each other (see FIG. 6). The second clinching dies 40B further have end-retaining projections 44 that retain the end surface of the cup-shaped female part 20 of the bolt-shaped member 10. The first and second clinching dies 40A and 40B each have a split structure. That is, each clinching die 40A (40B) is divided into two in the height direction thereof at a valley adjacent to the pushing projection 42 (43). Thus, each clinching die 40A (40B) comprises a pair of divided elements 40A' (40B') (see FIG. 7), which are integrally secured to an associated support block 46 by using a bolt 45.

The shrinker 50 includes shrinker bodies 51 having the support blocks 46 secured to the front sides thereof by using bolts 47. Each shrinker body 51 has a tapered surface on the rear side thereof. The shrinker 50 further has a cone member 52 placed in sliding contact with the tapered surface of each shrinker body 51, a hydraulic cylinder (not shown) that vertically drives the cone member 52, and a guide member 53 that backs up the back of the cone member 52. The shrinker bodies 51 shrink in synchronism with the downward movement of the cone member 52 driven by the hydraulic cylinder, thus causing the clinching dies 40 to move toward each other.

In the mechanical clinching apparatus arranged as stated above, as shown in FIG. 5, after the bolt-shaped member 10 has been set in the support tube 36 of the work support mechanism 30, the piston rod 4 is fitted into the female part 20 and thus butted against it. Thereafter, the clinching dies 40 are advanced toward each other by the shrink operation of the shrinker bodies 51 constituting the shrinker 50. Consequently, as shown in FIG. 7, the pushing projections 42 of the first clinching dies 40A and the pushing projections 43 of the second clinching dies 40B locally push the side wall of the female part 20 into the corresponding annular grooves 21, thereby forming clinch portions 22 (22A to 22C) staggered between each pair of mutually adjacent annular grooves 21. At this time, the pushed portions of the female part 20 reduce in thickness, resulting in an excess material being generated, as has been stated above. However, as shown in FIG. 7, the respective peripheries of the pushed portions are held by the shoulders of the associated clinching dies 40 (40A and 40B), and the end surface of the female part 20 is retained by the end-retaining projections 44 of the second clinching dies 40B. Therefore, the excess material flows into the annular grooves 21 adjacent to the pushed portions. This phenomenon is shown in FIG. 3 by the bulge of the material into the second annular groove 21B in the left-hand enlarged view and the bulge of the material into the third annular groove 21C in the right-hand enlarged view.

Particularly, in the mechanical clinching apparatus, the end surface of the female part 20 is retained by the end-retaining projections 44 of the second clinching dies 40B. Therefore, the elongation of the material of the female part 20 is suppressed considerably. As a result, the gap between the bottom surface inside the female part 20 of the bolt-shaped member 10 and the forward end of the piston rod 4 (i.e. at the butt joint) becomes extremely small (about 0.05 mm, by way of example). When the elongation of the material is suppressed in this way, large stress concentration occurs at the valleys adjacent to the pushing projections 42 and 43 of the clinching dies 40. In the mechanical clinching apparatus, however, each clinching die 40 is split at the valley. Therefore, the stress concentration is reduced, and as a result, breakage of the clinching dies 40 (40A and 40B) is prevented.

In the above-described mechanical clinching apparatus, the first clinching dies 40A are each provided with two pushing projections 42 corresponding to the two annular grooves 21A and 21C. However, when the number of annular grooves 21 provided on the piston rod 4 is two, only one pushing projection 42 is provided on each first clinching die 40A. The pushing projections 42 and 43 of the first and second clinching dies 40A and 40B should be appropriately disposed according to the arrangement pattern (see FIG. 4) of the clinch portions 22 to be formed. Further, although in the above-described mechanical clinching apparatus the end-retaining projections 44 are provided on only the second clinching dies 40B, end-retaining projections may be provided also on the first clinching dies 40A, depending on the number or installation position of pushing projections 42 provided on the first clinching dies 40A.

Figure 8:
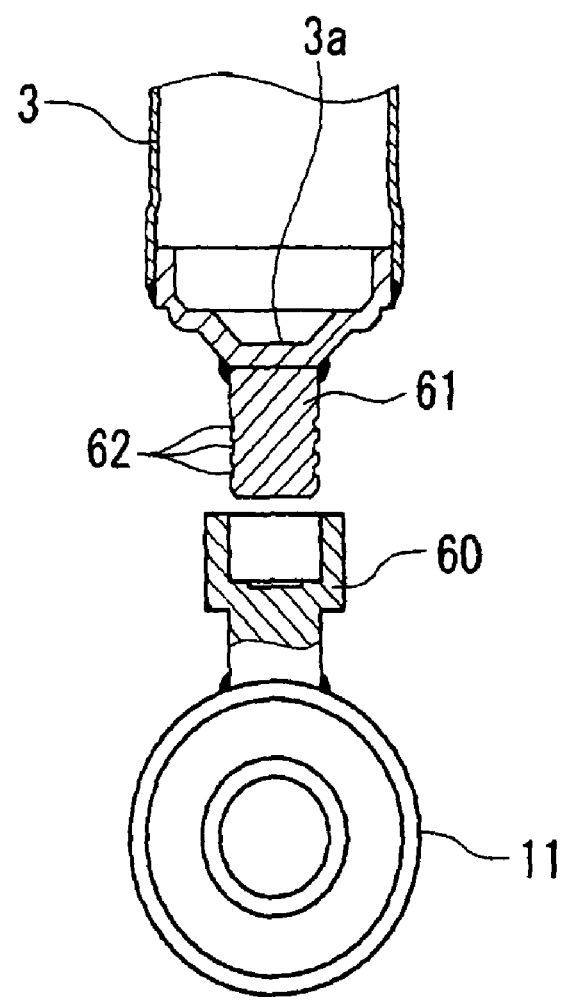
FIG. 8 is a sectional view showing an embodiment in which a butt joining method according to one embodiment of the present invention is applied to butt joining of an eye to the bottom of an outer tube of a hydraulic shock absorber.

Although in the above-described embodiment the present invention is applied to butt joining of the bolt-shaped member 10 and the piston rod 4 constituting a hydraulic shock absorber, by way of example, the present invention can be applied to butt joining of various members. For example, the present invention is also applicable to butt joining of the eye 11 to the bottom of the outer tube 3 in the hydraulic shock absorber shown in FIG. 9. In this case, as shown in FIG. 8, a female part 60 similar to the female part 20 is provided on the outer peripheral surface of the eye 11 as a first member. Meanwhile, a male part 61 fittable to the female part 60 is provided on the bottom 3a of the outer tube 3 as a second member, and annular grooves 62 are formed on the male part 61. By so doing, the present invention can be carried out.

When butt joining of the piston rod 4 and the bolt-shaped member (mounting member) 10 is effected by using mechanical clinching technique as in the foregoing embodiment, no spatters (contaminants) are generated unlike the joining process using projection welding, which has heretofore been generally adopted. Accordingly, no contaminants will adhere to the piston rod 4. In view of this point, the cylinder apparatus manufacturing method according to the present invention has been made. To manufacture the hydraulic shock absorber (cylinder apparatus) shown in FIG. 9, first, a bolt-shaped member (mounting member) 10 having a female part 20 at one end thereof and a threaded part (mounting part) 10b at the other end is prepared, together with a piston rod 4 having a plurality of annular grooves 21 formed on a forward end part (male part) fittable to the female part 20 (see FIG. 1). In addition, the rod guide 5 and the rod seal (seal member) 6 are fitted onto an intermediate portion of the piston rod 4, and the piston 1 is secured to one end of the piston rod 4 in advance (see FIG. 9).

Next, the piston rod 4 prepared as stated above is inserted from the piston 1 side into the cylinder 2 preassembled into the outer tube 3 with the base valve 8 interposed therebetween (see FIG. 9), and the rod guide 5 and the rod seal 6 are temporarily fitted to the openings of the cylinder 2 and the outer tube 3. Next, the rod guide 5 and the rod seal 6 are secured to the openings of the cylinder 2 and the outer tube 3 to close the openings by using the jig shown in the above-described Japanese Patent Application Publication No. 2002-81483 (which is incorporated herein by reference), for example. Further, a gas is sealed into the reservoir 9 (see FIG. 9) by using a gas sealing jig, if necessary. Because the cylinder's opening closing operation and the gas sealing operation are carried out before the bolt-shaped member 10 is joined to the piston rod 4, these operations can be smoothly performed without being interfered by the bolt-shaped member 10. Thereafter, the female part 20 and the male part are fitted to each other to butt the bolt-shaped member 10 and the piston rod 4 against each other and these members are joined together by mechanical clinching according to the procedure described in the foregoing embodiment. In this way, the hydraulic shock absorber is completed. Thus, the piston rod 4 and the bolt-shaped member 10 are joined together at the final step after the piston rod 4 has been assembled into the cylinder 2 and the opening of the cylinder 2 has been closed. Therefore, the cylinder's opening closing step and the gas sealing step, which precede the joining step, can be performed smoothly.

The butt joining method according to the foregoing embodiment enables two members to be butt-joined together with high strength and high accuracy by utilizing plastic deformation. Therefore, butt joining can be performed independently of the material of two members to be joined and regardless of whether or not these members have been subjected to surface treatment. Accordingly, the range of applications for butt joining expands significantly.

The mechanical clinching apparatus according to the foregoing embodiment enables a material to be pushed into a plurality of annular grooves simultaneously simply by arranging two different types of clinching dies alternately in the circumferential direction. This can be implemented by slight modification of existing mechanical clinching apparatus.

The joined rod according to the foregoing embodiment can be obtained independently of the material of two rod members to be joined and regardless of whether or not these rod members have been subjected to surface treatment. Therefore, the joined rod is very useful in a variety of applications, particularly as a rod of a hydraulic shock absorber for a suspension system.

The cylinder apparatus manufacturing method according to the foregoing embodiment joins together a mounting member and a piston rod at the final step. Therefore, it is possible to smoothly perform the cylinder's opening closing step, which precedes the joining step. The method imposes no limitation on the design of the piston rod and is therefore useful for the manufacture of cylinder apparatus.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2006-236732, filed on Aug. 31, 2006.

The entire disclosure of Japanese Patent Application No. 2006-236732 filed on Aug. 31, 2006 including specification, claims, drawings and summary is incorporated herein by reference in its entirety.

What is claimed is:

1. A joined rod comprising:
    a bolt member having a female part at one end thereof; and
    a piston rod having a plurality of annular grooves on an outer surface of a first end part thereof, the first end part of the piston rod being received within the female part, wherein the piston rod has a second end opposite to the first end part;
    wherein the annular grooves on the piston rod are trapezoidal in cross-section, each of the annular grooves having a first wall surface and a second wall surface, the first wall surface being closer to a joint end of the piston rod than the second wall surface, the first wall surface being perpendicular to an axis of the piston rod and the second wall surface being inclined with respect to the axis of the piston rod,
    wherein the piston rod has an oil seal for sealing an outer cylinder of a hydraulic shock absorber, the oil seal being disposed on the outer surface of the piston rod between the second end of the piston rod and the annular grooves by sliding over the annular grooves from the joint end,
    wherein the bolt member and the piston rod are joined together coaxially through annular clinches formed by radially and locally pushing a side wall of the female part of the bolt member into the annular grooves on the piston rod by a mechanical clinching technique when the first end part of the piston rod is received within the female part of the bolt, and
    wherein the bolt member is a mounting member having a mounting part at a second end thereof for securing the joined rod to another structure.

2. The joined rod of claim 1, wherein the annular clinches each comprise circumferentially spaced clinch portions, the clinch portions being circumferentially coincident between mutually adjacent ones of the annular clinches.

3. The joined rod of claim 1, wherein the annular clinches each comprise circumferentially spaced clinch portions, the clinch portions being circumferentially displaced between mutually adjacent ones of the annular clinches.

4. The joined rod of claim 1, wherein the annular clinches each comprise circumferentially spaced clinch portions, the clinch portions being circumferentially staggered between mutually adjacent ones of the annular clinches.

5. The joined rod of claim 1, wherein the annular clinches each comprise circumferentially spaced clinch portions,
    wherein the annular grooves are provided on a male part of the piston rod and comprise at least a first annular groove, a second annular groove, and a third annular groove, and
    wherein the clinch portions of the annular clinches for the first and third annular grooves are circumferentially coincident with each other, and the clinch portions of the annular clinch for the second annular groove are at circumferential midpoints between the clinch portions of the annular clinches for the first and third annular grooves.

6. The joined rod of claim 1, wherein the annular clinches are provided along an end surface of the female part of the bolt member.

7. The joined rod of claim 1, wherein the piston rod is a piston rod of a hydraulic shock absorber.

8. The joined rod of claim 1, wherein the joint end of the piston rod is a distal end which is inserted into the female part of the bolt member.

9. The joined rod of claim 8, wherein the oil seal is a preassembled oil seal which is placed on the piston rod by passing over the annular grooves from the joint end toward the second end of the piston rod.

10. The joined rod of claim 8, wherein each annular grooves has a third wall surface extending between the first wall surface and the second wall surface, the third wall surface being perpendicular to the first wall surface, and
    wherein the first wall surface and the second wall surface of each of the annular grooves extends between an outermost periphery of the piston rod and the third wall surface.

11. The joined rod of claim 1, wherein the oil seal is a preassembled oil seal which is placed on the piston rod by passing over the annular grooves from the joint end toward the second end of the piston rod.

12. The joined rod of claim 1, wherein each annular grooves has a third wall surface extending between the first wall surface and the second wall surface, the third wall surface being perpendicular to the first wall surface, and
    wherein the first wall surface and the second wall surface of each of the annular grooves extends between an outermost periphery of the piston rod and the third wall surface.

* * * * *